United States Patent
Guo et al.

(10) Patent No.: US 11,914,105 B2
(45) Date of Patent: Feb. 27, 2024

(54) CAMERA OPTICAL LENS

(71) Applicant: AAC Optics Solutions Pte. Ltd., Singapore (SG)

(72) Inventors: Zhanli Guo, Shenzhen (CN); Hiroyuki Teraoka, Osaka (JP); Wen Sun, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 834 days.

(21) Appl. No.: 16/999,096

(22) Filed: Aug. 21, 2020

(65) Prior Publication Data

US 2021/0055525 A1     Feb. 25, 2021

Related U.S. Application Data

(63) Continuation of application No. PCT/CN2019/107278, filed on Sep. 23, 2019.

(30) Foreign Application Priority Data

Aug. 19, 2019   (CN) .......................... 201910764690.0

(51) Int. Cl.
*G02B 13/00*     (2006.01)
*G02B 9/60*      (2006.01)
*G02B 27/00*     (2006.01)

(52) U.S. Cl.
CPC ........... *G02B 13/0045* (2013.01); *G02B 9/60* (2013.01); *G02B 27/0025* (2013.01)

(58) Field of Classification Search
CPC .... G02B 13/00; G02B 13/0045; G02B 13/04; G02B 13/18; G02B 3/04; G02B 15/177; G02B 9/60; G02B 27/00; G02B 27/0025
USPC ........ 359/714, 763, 764, 708, 746, 753, 682
See application file for complete search history.

(56) References Cited

U.S. PATENT DOCUMENTS

| | | | |
|---|---|---|---|
| 2012/0021802 A1* | 1/2012 | Sano ...................... | H04N 23/00 348/311 |
| 2016/0195699 A1* | 7/2016 | Tang .................. | G02B 13/0045 359/714 |

* cited by examiner

Primary Examiner — Jie Lei
(74) Attorney, Agent, or Firm — W&G Law Group

(57) ABSTRACT

A camera optical lens is provided, including, from an object side to an image side in sequence: a first, second, third, fourth and fifth lens respectively having positive, negative, negative, positive and negative refractive power, which satisfies conditions: $-0.17 \leq f1/f2 \leq -0.12$; $1.80 \leq d1/d2 \leq 2.20$; $0.15 \leq d6/d8 \leq 0.20$; $8.00 \leq (R3+R4)/(R3-R4) \leq 10.00$. f1 and f2 respectively denote focal length of the first and second lens; d1 denotes on-axis thickness of the first lens; d2, d6 and d8 respectively denote on-axis distance from image-side surface of the first lens to object-side surface of the second lens, from image-side surface of the third lens to object-side surface of the fourth lens and from image-side surface of the fourth lens to object-side surface of the fifth lens; R3 and R4 respectively denote curvature radius of object-side surface and image-side surface of the second lens. The camera optical lens can satisfy design requirement of large aperture, wide-angle and ultra-thinness while having good optical functions.

9 Claims, 9 Drawing Sheets

CAMERA OPTICAL LENS

TECHNICAL FIELD

The present disclosure relates to an optical lens, in particular to a camera optical lens suitable for handheld devices such as a smart phone and a digital camera, and a camera device such as a monitor or a PC lens.

BACKGROUND

With the emergence of smart phones in recent years, the demand for miniature camera lens is gradually increasing, but a photosensitive device of a general camera lens is no other than a charge coupled device (CCD) or a complementary metal-oxide semiconductor sensor (CMOS sensor). Since the progress of the semiconductor manufacturing technology makes a pixel size of the photosensitive device smaller, the current development trend of electronic products is that their functions should be better and their shape should be thin and small, the miniature camera lens with good imaging quality has become a mainstream in the market.

In order to obtain better imaging quality, the lens that is traditionally equipped in a mobile phone camera adopts a three-piece or four-piece lens structure. However, with the development of technology and the increase of the diverse demands of users, and under this circumstance that the pixel area of the photosensitive device is shrinking and the requirement of the system for the imaging quality is improving constantly, the five-piece lens structure gradually appear in a lens design. Although a common five-piece lens as such has good optical functions, it is fairly unreasonable in terms of setting of lens power, lens pitch and lens shape, which results in that the lens structure cannot satisfy a design requirement of large aperture, long focal length and ultra-thinness while having good optical functions.

SUMMARY

To address the above issues, the present disclosure aims to provide a camera optical lens that satisfies a design requirement of large aperture, wide-angle and ultra-thinness while having good optical functions.

In order to solve the above technical problems, the present disclosure provides a camera optical lens including, from an object side to an image side in sequence: a first lens having a positive refractive power, a second lens having a negative refractive power, a third lens having a negative refractive power, a fourth lens having a positive refractive power, and a fifth lens having a negative refractive power; where the camera optical lens satisfies following conditions:

$-0.17 \leq f1/f2 \leq -0.12$;

$1.80 \leq d1/d2 \leq 2.20$;

$0.15 \leq d6/d8 \leq 0.20$;

$8.00 \leq (R3+R4)/(R3-R4) \leq 10.00$;

where f1 denotes a focal length of the first lens; f2 denotes a focal length of the second lens; d1 denotes an on-axis thickness of the first lens; d2 denotes an on-axis distance from an image-side surface of the first lens to an object-side surface of the second lens; d6 denotes an on-axis distance from an image-side surface of the third lens to an object-side surface of the fourth lens; d8 denotes an on-axis distance from an image-side surface of the fourth lens to an object-side surface of the fifth lens; R3 denotes a curvature radius of the object-side surface of the second lens; and R4 denotes a curvature radius of an image-side surface of the second lens.

As an improvement, the camera optical lens further satisfies the following condition:

$11.00 \leq R7/f \leq 12.00$;

where f denotes a focal length of the camera optical lens; and R7 denotes a curvature radius of the object-side surface of the fourth lens.

As an improvement, the camera optical lens further satisfies the following condition:

$0.61 \leq f1/f \leq 1.86$;

$-3.94 \leq (R1+R2)/(R1-R2) \leq -1.17$;

$0.07 \leq d1/TTL \leq 0.22$;

where f denotes a focal length of the camera optical lens; R1 denotes a curvature radius of an object-side surface of the first lens; R2 denotes a curvature radius of the image-side surface of the first lens; and TTL denotes a total optical length from the object-side surface of the first lens to an image surface of the camera optical lens along an optic axis.

As an improvement, the camera optical lens further satisfies the following conditions:

$-19.80 \leq f2/f \leq -4.92$;

$0.03 \leq d3/TTL \leq 0.10$;

where f denotes a focal length of the camera optical lens; d3 denotes an on-axis thickness of the second lens; and TTL denotes a total optical length from an object-side surface of the first lens to an image surface of the camera optical lens along an optical axis.

As an improvement, the camera optical lens further satisfies the following conditions:

$-5.62 \leq f3/f \leq -1.64$;

$-5.34 \leq (R5+R6)/(R5-R6) \leq -1.35$;

$0.03 \leq d5/TTL \leq 0.09$;

where f3 denotes a focal length of the third lens; f denotes a focal length of the camera optical lens; R5 denotes a curvature radius of an object-side surface of the third lens; R6 denotes a curvature radius of the image-side surface of the third lens; d5 denotes an on-axis thickness of the third lens; and TTL denotes a total optical length from an object-side surface of the first lens to an image surface of the camera optical lens along an optical axis.

As an improvement, the camera optical lens further satisfies the following conditions:

$0.27 \leq f4/f \leq 0.86$;

$0.47 \leq (R7+R8)/(R7-R8) \leq 1.43$;

$0.09 \leq d7/TTL \leq 0.29$;

where f4 denotes a focal length of the fourth lens; f denotes a focal length of the camera optical lens; R7 denotes a curvature radius of the object-side surface of the fourth lens; R8 denotes a curvature radius of the image-side surface of the fourth lens; d7 denotes an on-axis thickness of the fourth lens; and TTL denotes a total optical length from an object-side surface of the first lens to an image surface of the camera optical lens along an optical axis.

As an improvement, the camera optical lens further satisfies the following conditions:

$-1.28 \le f5/f \le -0.41$;

$0.84 \le (R9+R10)/(R9-R10) \le 2.61$;

$0.04 \le d9/TTL \le 0.14$;

where f5 denotes a focal length of the fifth lens; f denotes a focal length of the camera optical lens; R9 denotes a curvature radius of the object-side surface of the fifth lens; R10 denotes a curvature radius of an image-side surface of the fifth lens; d9 denotes an on-axis thickness of the fifth lens; and TTL denotes a total optical length from an object-side surface of the first lens to an image surface of the camera optical lens along an optical axis.

As an improvement, the camera optical lens further satisfies the following conditions:

$TTL/IH \le 1.61$;

where TTL denotes a total optical length from an object-side surface of the first lens to an image surface of the camera optical lens along an optical axis; and IH denotes an image height of the camera optical lens.

As an improvement, the camera optical lens further satisfies the following conditions:

$Fov \ge 78.00°$;

where Fov denotes a field of view of the camera optical lens.

As an improvement, the camera optical lens further satisfies the following condition:

$Fno \le 2.05$;

where Fno denotes an F number of the camera optical lens.

The beneficial effects of the present disclosure are described as below: the camera optical lens in the present disclosure has good optical functions and has characteristics of large aperture, wide-angle and ultra-thinness, and is particularly suitable for WEB camera lenses and mobile phone camera lens assemblies composed by such camera elements as CCD and CMOS for high pixels.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort, where.

DETAILED DESCRIPTION OF THE EXEMPLARY EMBODIMENTS

To make the objects, technical solutions, and advantages of the present disclosure clearer, the embodiments of the present disclosure are described in detail with reference to the accompanying drawings in the following. A person of ordinary skill in the related art can understand that, in the embodiments of the present disclosure, many technical details are provided to make readers better understand this application. However, even without these technical details and any changes and modifications based on the following embodiments, technical solutions required to be protected by this application can be implemented.

Embodiment 1

Figure 1:
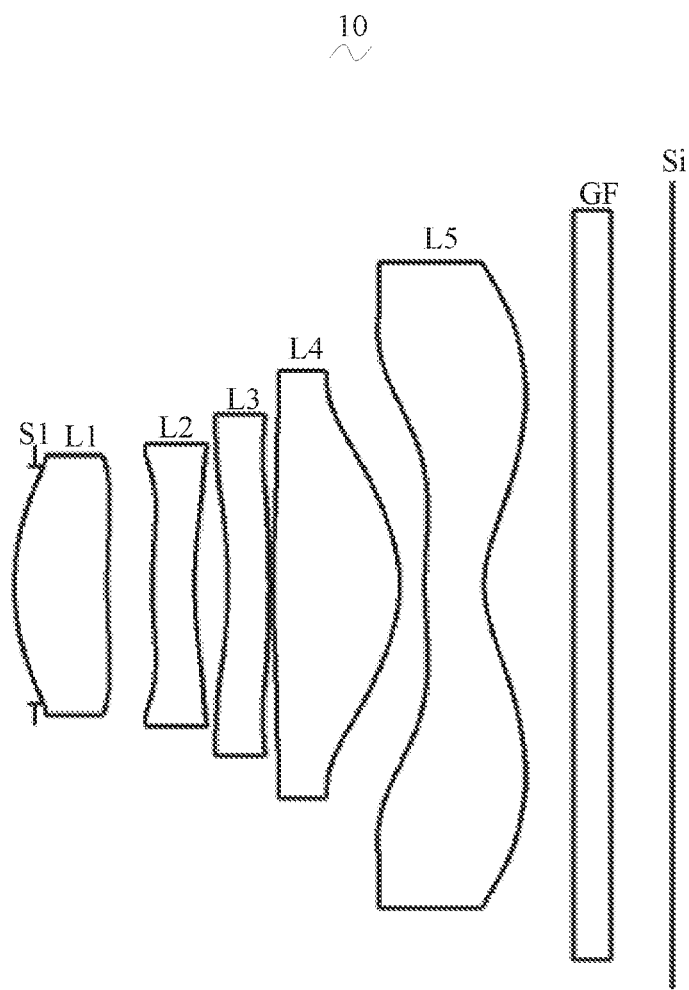
FIG. 1 is a schematic diagram of a structure of a camera optical lens in accordance with Embodiment 1 of the present disclosure.

As referring to the accompanying drawings, the present disclosure provides a camera optical lens 10. FIG. 1 shows the camera optical lens 10 of Embodiment 1 of the present disclosure, the camera optical lens 10 comprises five lenses. Specifically, the camera optical lens 10 includes, from an object-side to an image-side in sequence: an aperture S1, a first lens L1 having a positive refractive power, a second lens L2 having a negative refractive power, a third lens L3 a negative refractive power, a fourth lens L4 having a positive refractive power, a fifth lens L5 having a negative refractive power. An optical element like an optical filter GF may be arranged between the fifth lens L5 and an image surface Si.

In this embodiment, a focal length of the first lens L1 is defined as f1, and a focal length of the second lens L2 is defined as f2. The camera optical lens 10 satisfies the following condition: $-0.17 \le f1/f2 \le -0.12$, which specifies a ratio of the focal length of the first lens L1 and the focal length of the second lens L2. Within this range, it is beneficial for correcting a spherical aberration of the camera optical lens and the quality of the imaging is improved.

An on-axis thickness of the first lens L1 is defined as d1, and an on-axis distance from an image-side surface of the first lens L1 to an object-side surface of the second lens L2. The camera optical lens 10 satisfies the following condition: $1.80 \le d1/d2 \le 2.20$, which specifies a ratio of the thickness of the first lens L1 and an air-spaced distance between the first lens L1 and the second lens L2. Within this range, it is beneficial for the manufacturing and assembling of the camera optical lens.

An on-axis distance from an image-side surface of the third lens L3 to an object-side surface of the fourth lens L4 is defined as d6, and an on-axis distance from an image-side surface of the fourth lens L4 to an object-side surface of the fifth lens L5 is defined as d8. The camera optical lens 10 satisfies the following condition: $0.15 \le d6/d8 \le 0.20$. Within this range, it is beneficial for shortening a total optical length from the object-side surface of the first lens to an image surface of the camera optical lens along an optical axis.

A curvature radius of the object-side surface of the second lens L2 is defined as R3, and a curvature radius of the image-side surface of the second lens L2 is defined as R4. The camera optical lens 10 satisfies the following condition: $8.00 \leq (R3+R4)/(R3-R4) \leq 10.00$, which specifies a shape of the second lens L2. Within this range, a deflection degree of light passing through the lens can be relaxed and an aberration can be effectively reduced.

A focal length of the camera optical lens 10 is defined as f, and a curvature radius of the object-side surface of the fourth lens L4 is defined as R7. The camera optical lens 10 satisfies the following condition: $11.00 \leq R7/f \leq 12.00$. Within this range, it is beneficial for improving functions of the camera optical lens 10.

The focal length of the camera optical lens 10 is defined as f, and the focal length of the first lens L1 is defined as f1. The camera optical lens 10 satisfies the following condition: $0.61 \leq f1/f \leq 1.86$, which specifies the positive refractive power of the first lens L1 and the total focal length of the camera optical lens 10. Within this range, the first lens L1 has an appropriate positive refractive power, which is beneficial for reducing the aberration of the camera optical lens and facilitate a development towards ultra-thin and wide-angle lenses.

A curvature radius of the object-side surface of the first lens L1 is defined as R1, and a curvature radius of the image-side surface of the first lens is defined as R2. The camera optical lens 10 satisfies the following condition: $-3.94 \leq (R1+R2)/(R1-R2) \leq -1.17$. This can reasonably control a shape of the first lens L1 in such a manner that the first lens L1 can effectively correct the spherical aberration of the camera optical lens.

The on-axis thickness of the first lens L1 is defined as d1, and a total optical length from the object-side surface of the first lens L1 to an image surface of the camera optical lens 10 along an optic axis is defined as TTL. The camera optical lens 10 satisfies the following condition: $0.07 \leq d1/TTL \leq 0.22$. This can facilitate achieving ultra-thin lenses.

The focal length of the camera optical lens 10 is defined as f, and the focal length of the second lens L2 is defined as f2. The camera optical lens 10 satisfies the following condition: $-19.80 \leq f2/f \leq -4.92$. It is beneficial for correcting the aberration of the camera optical lens by controlling a negative power of the second lens L2 within a reasonable range.

An on-axis thickness of the second lens L2 is defined as d3, and the total optical length from the object-side surface of the first lens L1 to an image surface of the camera optical lens 10 along an optic axis is defined as TTL. The camera optical lens 10 satisfies the following condition: $0.03 \leq d3/TTL \leq 0.10$. This can facilitate achieving ultra-thin lenses.

A focal length of the third lens L3 is defined as f3, and the focal length of the camera optical lens 10 is defined as f. The camera optical lens 10 satisfies the following condition: $-5.62 \leq f3/f \leq -1.64$. An appropriate distribution of the refractive power leads to a better imaging quality and a lower sensitivity.

A curvature radius of the object-side surface of the third lens L3 is defined as R5, a curvature radius of the image-side surface of the third lens L3 is defined as R6, and the camera optical lens 10 satisfies the following condition: $-5.34 \leq (R5+R6)/(R5-R6) \leq -1.35$. This can effectively control a shape of the third lens L3, thereby facilitating shaping of the third lens L3 and avoiding bad shaping and generation of stress due to the overly large surface curvature of the third lens L3.

An on-axis thickness of the third lens L3 is defined as d5, and the total optical length from the object-side surface of the first lens L1 to an image surface of the camera optical lens 10 along an optic axis is defined as TTL. The camera optical lens 10 satisfies the following condition: $0.03 \leq d5/TTL \leq 0.09$. This can facilitate achieving ultra-thin lenses.

A focal length of the fourth lens L4 is defined as f4, the focal length of the camera optical lens 10 is defined as f, and the camera optical lens 10 satisfies the following condition: $0.27 \leq f4/f \leq 0.86$. The appropriate distribution of refractive power makes it possible that the camera optical lens has the better imaging quality and the lower sensitivity.

A curvature radius of the object-side surface of the fourth lens L4 is defined as R7, and a curvature radius of the image-side surface of the fourth lens L4 is defined as R8. The camera optical lens 10 satisfies the following condition: $0.47 \leq (R7+R8)/(R7-R8) \leq 1.43$, which specifies a shape of the fourth lens L4. Within this range, a development towards ultra-thin and wide-angle lens would facilitate correcting a problem like an off-axis aberration.

An on-axis thickness of the fourth lens L4 is defined as d7, and the total optical length from the object-side surface of the first lens L1 to an image surface of the camera optical lens 10 along an optic axis is defined as TTL. The camera optical lens 10 satisfies the following condition: $0.09 \leq d7/TTL \leq 0.29$. This can facilitate achieving ultra-thin lenses.

A focal length of the fifth lens L5 is defined as f5. The camera optical lens 10 satisfies the following condition: $-1.28 \leq f5/f \leq -0.41$, which can effectively make a light angle of the camera lens gentle and reduce tolerance sensitivity.

A curvature radius of the object-side surface of the fifth lens L5 is defined as R9, and a curvature radius of an image-side surface of the fifth lens L5 is defined as R10. The camera optical lens 10 satisfies the following condition: $0.84 \leq (R9+R10)/(R9-R10) \leq 2.61$, which specifies a shape of the fifth lens L5. Within this range, a development towards ultra-thin and wide-angle lenses can facilitate correcting a problem of the off-axis aberration.

An on-axis thickness of the fifth lens L5 is defined as d9, and the total optical length from the object-side surface of the first lens L1 to an image surface of the camera optical lens 10 along an optic axis is defined as TTL. The camera optical lens 10 satisfies the following condition: $0.04 \leq d9/TTL \leq 0.14$. This can facilitate achieving ultra-thin lenses.

As an improvement, the total optical length from the object-side surface of the first lens L1 to an image surface of the camera optical lens 10 along an optic axis is defined as TTL, an image height of the camera optical lens 10 is defined as IH, and the camera optical lens 10 satisfies the following condition: $TTL/IH \leq 1.61$. This can facilitate achieving ultra-thin lenses. An F number of the camera optical lens 10 is defined as Fno, and the camera optical lens 10 satisfies the following condition: $Fno \leq 2.05$. This can facilitate achieving large-aperture lenses and good imaging performance. A field of view of the camera optical lens 10 is defined as Fov, and the camera optical lens 10 satisfies the following condition: $Fov \geq 78.00°$. This can facilitate achieving wide-angle lenses. That is, the camera optical lens can satisfy a design requirement of large aperture, wide-angle and ultra-thinness while having good optical functions when the above conditions have been satisfied. According to the characteristics of the camera optical lens 10, the camera optical lens 10 is particularly suitable for WEB camera lenses and mobile phone camera lens assemblies composed by such camera elements as CCD and CMOS for high pixels.

In the following, an example will be used to describe the camera optical lens 10 of the present disclosure. The symbols recorded in each example are as follows. The unit of a focal length, an on-axis distance, a curvature radius, an on-axis thickness, an inflexion point position, and an arrest point position are all in units of mm.

TTL: Optical length (a total optical length from the object-side surface of the first lens L1 to an image surface Si of the camera optical lens along an optic axis) in mm.

As an improvement, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R | d |  | nd |  | vd |
|---|---|---|---|---|---|---|
| S1 | ∞ | d0= | −0.117 |  |  |  |
| R1 | 1.392 | d1= | 0.521 | nd1 | 1.5450 | v1 | 55.81 |
| R2 | 5.048 | d2= | 0.254 |  |  |  |
| R3 | 3.033 | d3= | 0.235 | nd2 | 1.6610 | v2 | 20.53 |
| R4 | 2.434 | d4= | 0.187 |  |  |  |
| R5 | −2.729 | d5= | 0.229 | nd3 | 1.6610 | v3 | 20.53 |
| R6 | −6.000 | d6= | 0.026 |  |  |  |
| R7 | 31.755 | d7= | 0.707 | nd4 | 1.5450 | v4 | 55.81 |
| R8 | −0.883 | d8= | 0.141 |  |  |  |
| R9 | 2.412 | d9= | 0.332 | nd5 | 1.5450 | v5 | 55.81 |
| R10 | 0.653 | d10= | 0.500 |  |  |  |
| R11 | ∞ | d11= | 0.210 | ndg | 1.5168 | vg | 64.17 |
| R12 | ∞ | d12= | 0.344 |  |  |  |

In the table, meanings of various symbols will be described as follows.

S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the optical filter GF;
R12: curvature radius of the image-side surface of the optical filter GF;
d: on-axis thickness of the lens and on-axis distance between the lens;
d0: on-axis distance from aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
d11: on-axis thickness of the optical filter GF;
d12: on-axis distance from the image-side surface to the image surface Si of the optical filter GF;
nd: refractive index of a d line;
nd1: refractive index of a d line of the first lens L1;
nd2: refractive index of a d line of the second lens L2;
nd3: refractive index of a d line of the third lens L3;
nd4: refractive index of a d line of the fourth lens L4;
nd5: refractive index of a d line of the fifth lens L5;
ndg: refractive index of a d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows a spherical surface data of the camera optical lens 10 in Embodiment 1 of the present disclosure.

TABLE 2

|  | Conic coefficient | Aspheric surface coefficients | | | |
|---|---|---|---|---|---|
|  | k | A4 | A6 | A8 | A10 |
| R1 | 1.1822E+00 | −5.8364E−02 | −1.3104E+00 | 2.0212E+01 | −1.6787E+02 |
| R2 | −2.3972E+01 | −1.5904E−01 | 2.0922E−01 | −2.5307E+00 | 7.7218E+00 |
| R3 | −3.4540E+01 | −8.5900E−02 | −2.1394E+00 | 1.3833E+01 | −7.4214E+01 |
| R4 | −6.8311E+01 | 5.2801E−01 | −3.6889E+00 | 1.4918E+01 | −4.7028E+01 |
| R5 | 3.6985E+00 | 1.3667E−01 | 4.7847E−01 | −8.3367E+00 | 5.0734E+01 |
| R6 | 6.9834E+00 | 5.5977E−01 | −3.3884E+00 | 6.8955E+00 | −1.0867E+00 |
| R7 | 4.7202E+01 | 6.7025E−01 | −3.4995E+00 | 7.1386E+00 | −5.0358E+00 |

TABLE 2-continued

| | | | | | |
|---|---|---|---|---|---|
| R8 | −9.6414E−01 | 3.8244E−01 | 2.9295E−02 | −1.8926E+00 | 5.0550E+00 |
| R9 | −8.6883E+01 | −3.0915E−01 | 9.8576E−02 | −8.6131E−02 | 2.1189E−01 |
| R10 | −4.8621E+00 | −2.7439E−01 | 2.6161E−01 | −2.1593E−01 | 1.3999E−01 |

| Aspheric surface coefficients | | | | | |
|---|---|---|---|---|---|
| | A12 | A14 | A16 | A18 | A20 |
| R1 | 7.9881E+02 | −2.2906E+03 | 3.9070E+03 | −3.6544E+03 | 1.4434E+03 |
| R2 | −4.4260E+00 | −4.1828E+01 | 1.2662E+02 | −1.4681E+02 | 6.2979E+01 |
| R3 | 2.4931E+02 | −5.1120E+02 | 6.3884E+02 | −4.4692E+02 | 1.3349E+02 |
| R4 | 9.9380E+01 | −1.1614E+02 | 4.9595E+01 | 2.4278E+01 | −2.2153E+01 |
| R5 | −1.5977E+02 | 2.9967E+02 | −3.3937E+02 | 2.1320E+02 | −5.6614E+01 |
| R6 | −1.6089E+01 | 2.8468E+01 | −2.4021E+01 | 1.0879E+01 | −2.1508E+00 |
| R7 | −5.5006E+00 | 1.5293E+01 | −1.4504E+01 | 6.7387E+00 | −1.2869E+00 |
| R8 | −7.3599E+00 | 6.7501E+00 | −3.7680E+00 | 1.1484E+00 | −1.4553E−01 |
| R9 | −1.9013E−01 | 8.8674E−02 | −2.3928E−02 | 3.5903E−03 | −2.3332E−04 |
| R10 | −6.8741E−02 | 2.4275E−02 | −5.7143E−03 | 7.8850E−04 | −4.7436E−05 |

Herein, K is a conic coefficient, A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above condition (1). However, the present disclosure is not limited to the aspherical polynomials form shown in the condition (1).

Table 3 and table 4 show design data of inflexion points and arrest points of the camera optical lens 10 lens in Embodiment 1 of the present disclosure. Herein, P1R1 and P1R2 represent the object-side surface and image-side surface of the first lens L1, P2R1 and P2R2 represent the object-side surface and image-side surface of the second lens L2, P3R1 and P3R2 represent the object-side surface and image-side surface of the third lens L3, P4R1 and P4R2 represent the object-side surface and image-side surface of the fourth lens L4, P5R1 and P5R2 represent the object-side surface and image-side surface of the fifth lens L5. The data in the column named "inflexion point position" are vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 0.665 | 0 | 0 |
| P1R2 | 1 | 0.295 | 0 | 0 |
| P2R1 | 2 | 0.265 | 0.705 | 0 |
| P2R2 | 2 | 0.395 | 0.655 | 0 |
| P3R1 | 3 | 0.495 | 0.765 | 0.825 |
| P3R2 | 2 | 0.575 | 0.885 | 0 |
| P4R1 | 3 | 0.375 | 0.665 | 0.945 |
| P4R2 | 2 | 0.825 | 1.195 | 0 |
| P5R1 | 3 | 0.225 | 1.035 | 1.735 |
| P5R2 | 3 | 0.415 | 1.765 | 1.935 |

TABLE 4

| | Number(s) of arrest points | Arrest point position 1 | Arrest point position 2 |
|---|---|---|---|
| P1R1 | 0 | 0 | 0 |
| P1R2 | 1 | 0.475 | 0 |

TABLE 4-continued

| | Number(s) of arrest points | Arrest point position 1 | Arrest point position 2 |
|---|---|---|---|
| P2R1 | 1 | 0.435 | 0 |
| P2R2 | 0 | 0 | 0 |
| P3R1 | 0 | 0 | 0 |
| P3R2 | 1 | 0.745 | 0 |
| P4R1 | 1 | 1.025 | 0 |
| P4R2 | 0 | 0 | 0 |
| P5R1 | 2 | 0.435 | 1.465 |
| P5R2 | 1 | 1.095 | 0 |

Figure 2:
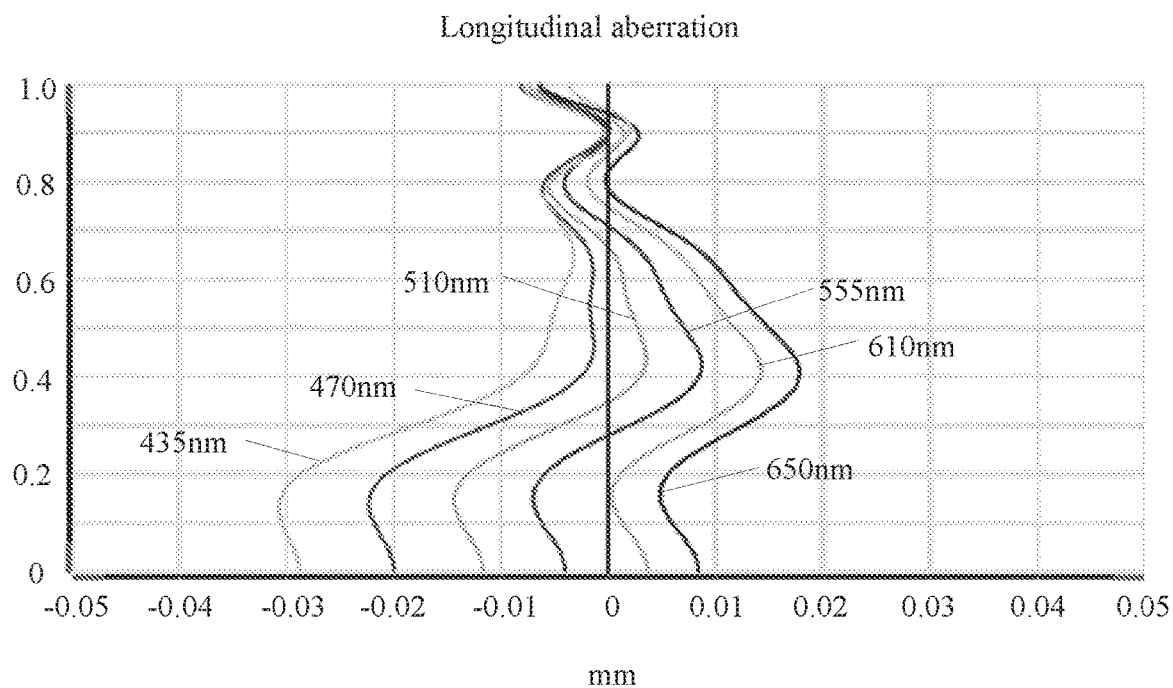
FIG. 2 is a schematic diagram of a longitudinal aberration of the camera optical lens shown in FIG. 1.
Figure 3:
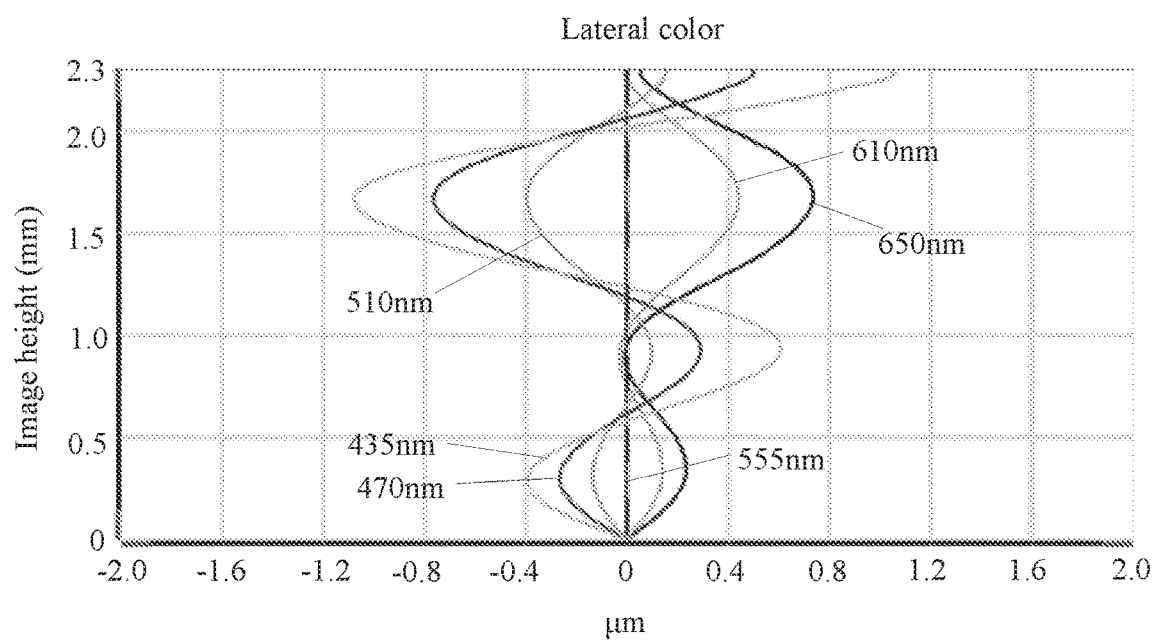
FIG. 3 is a schematic diagram of a lateral color of the camera optical lens shown in FIG. 1.
Figure 4:
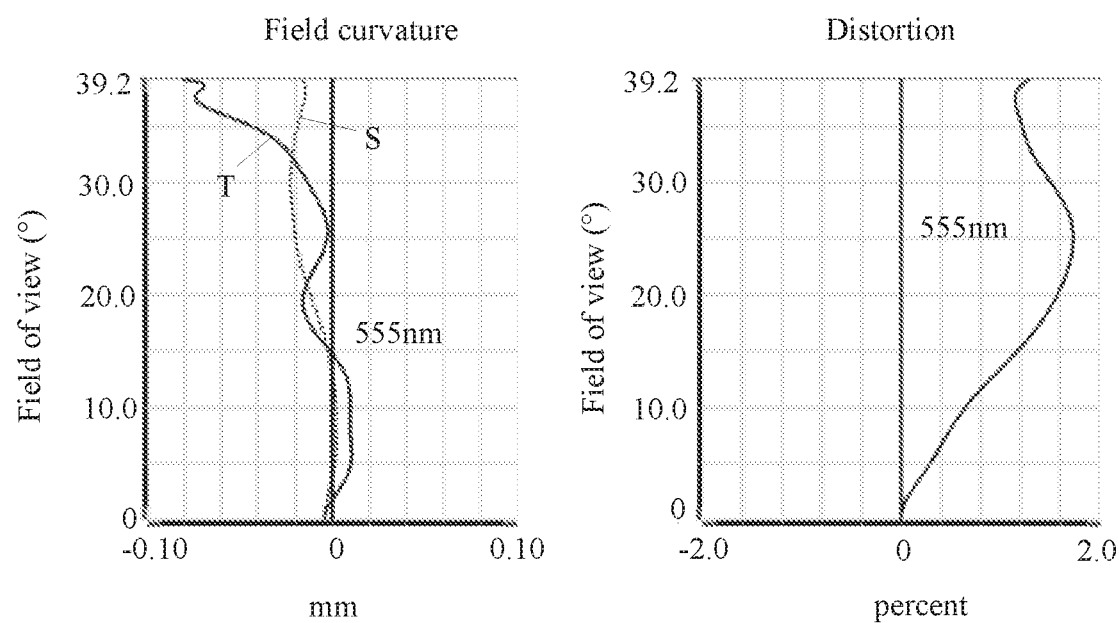
FIG. 4 is a schematic diagram of a field curvature and a distortion of the camera optical lens shown in FIG. 1.

FIG. 2 shows a longitudinal aberration of light with wavelengths of 435 nm, 470 nm, 510 nm, 555 nm, 610 nm and 650 nm passes the camera optical lens 10 in Embodiment 1, and FIG. 3 shows a lateral color of light with wavelengths of 435 nm, 470 nm, 510 nm, 555 nm, 610 nm and 650 nm passes the camera optical lens 10 in Embodiment 1. FIG. 4 shows a field curvature and a distortion schematic diagram after light with a wavelength of 555 nm passes the camera optical lens 10 in Embodiment 1, a field curvature S in FIG. 4 is a field curvature in a sagittal direction, T is a field curvature in a tangential direction.

Table 13 in the following shows various values of Embodiments 1, 2, 3 and values corresponding to the parameters which are already specified in the conditions.

As shown in Table 13, Embodiment 1 satisfies the various conditions.

In this embodiment, an entrance pupil diameter of the camera optical lens is 1.359 mm, an image height of 1.0H is 2.300 mm, and an Fov (field of view) in the diagonal direction is 78.40°. Thus, the camera optical lens 10 has a large aperture, wide-angle and ultra-thinness. Its on-axis and off-axis aberrations are fully corrected, thereby achieving excellent optical characteristics.

Embodiment 2

Figure 5:
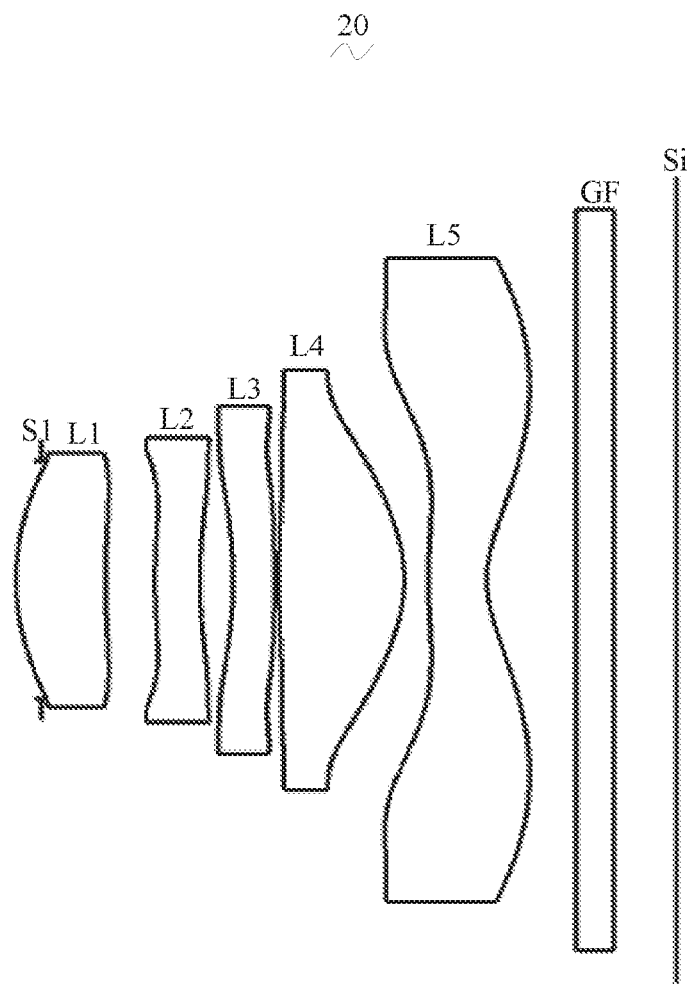
FIG. 5 is a schematic diagram of a structure of a camera optical lens in accordance with Embodiment 2 of the present disclosure.

Embodiment 2 is basically the same as Embodiment 1, and the meaning of its symbols is the same as that of Embodiment 1. A structure of the camera optical lens 20 in Embodiment 2 is shown in FIG. 5. In the following, only differences are described.

Table 5 and table 6 show design data of a camera optical lens 20 in Embodiment 2 of the present disclosure.

TABLE 5

| | R | | d | nd | | vd | |
|---|---|---|---|---|---|---|---|
| S1 | ∞ | d0= | −0.141 | | | | |
| R1 | 1.361 | d1= | 0.499 | nd1 | 1.5450 | v1 | 55.81 |
| R2 | 4.511 | d2= | 0.276 | | | | |
| R3 | 3.364 | d3= | 0.253 | nd2 | 1.6610 | v2 | 20.53 |
| R4 | 2.751 | d4= | 0.183 | | | | |
| R5 | −2.607 | d5= | 0.230 | nd3 | 1.6610 | v3 | 20.53 |
| R6 | −6.442 | d6= | 0.026 | | | | |
| R7 | 32.828 | d7= | 0.700 | nd4 | 1.5450 | v4 | 55.81 |
| R8 | −0.830 | d8= | 0.134 | | | | |
| R9 | 2.454 | d9= | 0.325 | nd5 | 1.5450 | v5 | 55.81 |
| R10 | 0.633 | d10= | 0.500 | | | | |
| R11 | ∞ | d11= | 0.210 | ndg | 1.5168 | vg | 64.17 |
| R12 | ∞ | d12= | 0.349 | | | | |

Table 6 shows aspherical surface data of each lens of the camera optical lens 20 in Embodiment 2 of the present disclosure.

TABLE 6

| | Conic coefficient | Aspheric surface coefficients | | | |
|---|---|---|---|---|---|
| | k | A4 | A6 | A8 | A10 |
| R1 | 1.1588E+00 | −1.1472E−01 | 5.5438E−01 | −5.6680E+00 | 2.7010E+01 |
| R2 | −1.2920E+01 | −1.0076E−01 | −3.3175E−01 | 1.1291E+00 | −4.9588E+00 |
| R3 | −3.2748E+01 | −1.6007E−01 | −9.4457E−01 | 3.1833E+00 | −1.4341E+01 |
| R4 | −6.6935E+01 | 3.1205E−01 | −2.3454E+00 | 8.2624E+00 | −2.1650E+01 |
| R5 | 3.6025E+00 | 9.2038E−02 | −5.5079E−01 | 3.3070E−01 | 1.2634E+01 |
| R6 | 1.0000E+01 | 5.6739E−01 | −4.0373E+00 | 9.0434E+00 | −2.8716E+00 |
| R7 | 4.8000E+01 | 8.1011E−01 | −4.6584E+00 | 1.1436E+01 | −1.4604E+01 |
| R8 | −1.0024E+00 | 5.3555E−01 | −6.2797E−01 | −3.8086E−02 | 1.3974E+00 |
| R9 | −8.7000E+01 | −2.6344E−01 | −7.3212E−02 | 1.8612E−01 | −1.6652E−02 |
| R10 | −4.8684E+00 | −2.6022E−01 | 2.1638E−01 | −1.3866E−01 | 6.2224E−02 |

| | Aspheric surface coefficients | | | | |
|---|---|---|---|---|---|
| | A12 | A14 | A16 | A18 | A20 |
| R1 | −7.4069E+01 | 1.0568E+02 | −6.1806E+01 | 0.0000E+00 | 0.0000E+00 |
| R2 | 1.1237E+01 | −1.3801E+01 | 7.2588E+00 | 0.0000E+00 | 0.0000E+00 |
| R3 | 4.1380E+01 | −8.0532E+01 | 1.2385E+02 | −1.2281E+02 | 5.3271E+01 |
| R4 | 3.8032E+01 | −3.7800E+01 | 1.8548E+01 | −5.7622E+00 | 3.7698E+00 |
| R5 | −3.9381E+01 | 3.6168E+01 | 2.1402E+01 | −5.9873E+01 | 3.0205E+01 |
| R6 | −1.7640E+01 | 3.0061E+01 | −2.0628E+01 | 5.9326E+00 | −3.7392E−01 |
| R7 | 8.4848E+00 | 1.6570E+00 | −5.9465E+00 | 3.6183E+00 | −7.8472E−01 |
| R8 | −2.7282E+00 | 3.1659E+00 | −2.1472E+00 | 7.6041E−01 | −1.0836E−01 |
| R9 | −7.1133E−02 | 4.6731E−02 | −1.3827E−02 | 2.0864E−03 | −1.3114E−04 |
| R10 | −1.8236E−02 | 3.1187E−03 | −2.4380E−04 | 1.7728E−06 | 3.0017E−07 |

Table 7 and table 8 show inflexion points and arrest point design data of the camera optical lens 20 lens in Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 0.655 | 0 | 0 |
| P1R2 | 1 | 0.325 | 0 | 0 |
| P2R1 | 2 | 0.265 | 0.705 | 0 |
| P2R2 | 2 | 0.375 | 0.675 | 0 |
| P3R1 | 3 | 0.495 | 0.765 | 0.815 |
| P3R2 | 2 | 0.565 | 0.875 | 0 |
| P4R1 | 3 | 0.365 | 0.665 | 0.975 |
| P4R2 | 2 | 0.825 | 1.215 | 0 |
| P5R1 | 3 | 0.235 | 1.015 | 1.725 |
| P5R2 | 3 | 0.415 | 1.805 | 1.865 |

TABLE 8

| | Number(s) of arrest points | Arrest point position 1 | Arrest point position 2 | Arrest point position 3 |
|---|---|---|---|---|
| P1R1 | 0 | 0 | 0 | 0 |
| P1R2 | 1 | 0.515 | 0 | 0 |
| P2R1 | 1 | 0.425 | 0 | 0 |
| P2R2 | 0 | 0 | 0 | 0 |
| P3R1 | 0 | 0 | 0 | 0 |
| P3R2 | 2 | 0.745 | 0.955 | 0 |
| P4R1 | 3 | 0.595 | 0.725 | 1.045 |
| P4R2 | 0 | 0 | 0 | 0 |
| P5R1 | 2 | 0.435 | 1.455 | 0 |
| P5R2 | 1 | 1.115 | 0 | 0 |

Figure 6:
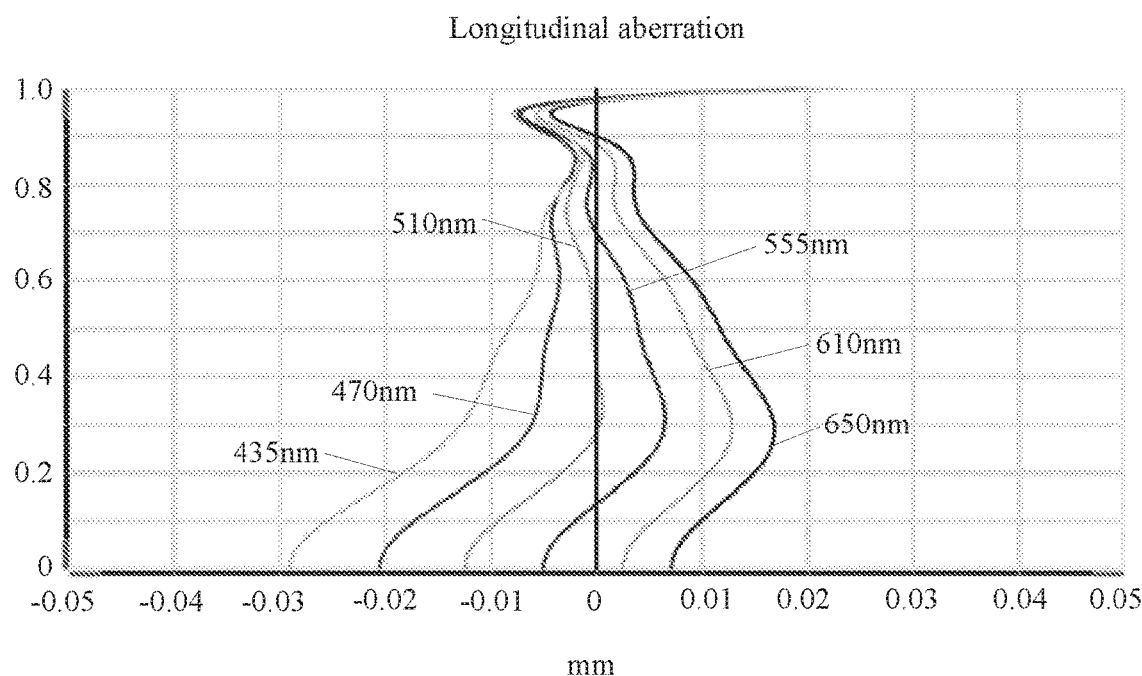
FIG. 6 is a schematic diagram of a longitudinal aberration of the camera optical lens shown in FIG. 5.
Figure 7:
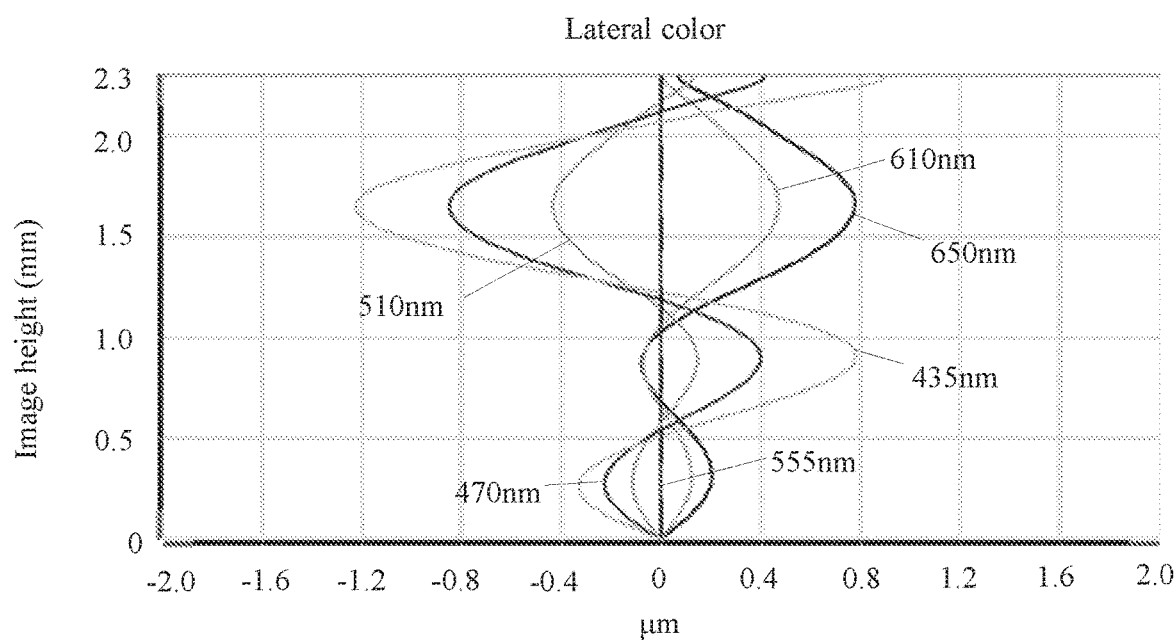
FIG. 7 is a schematic diagram of a lateral color of the camera optical lens shown in FIG. 5.
Figure 8:
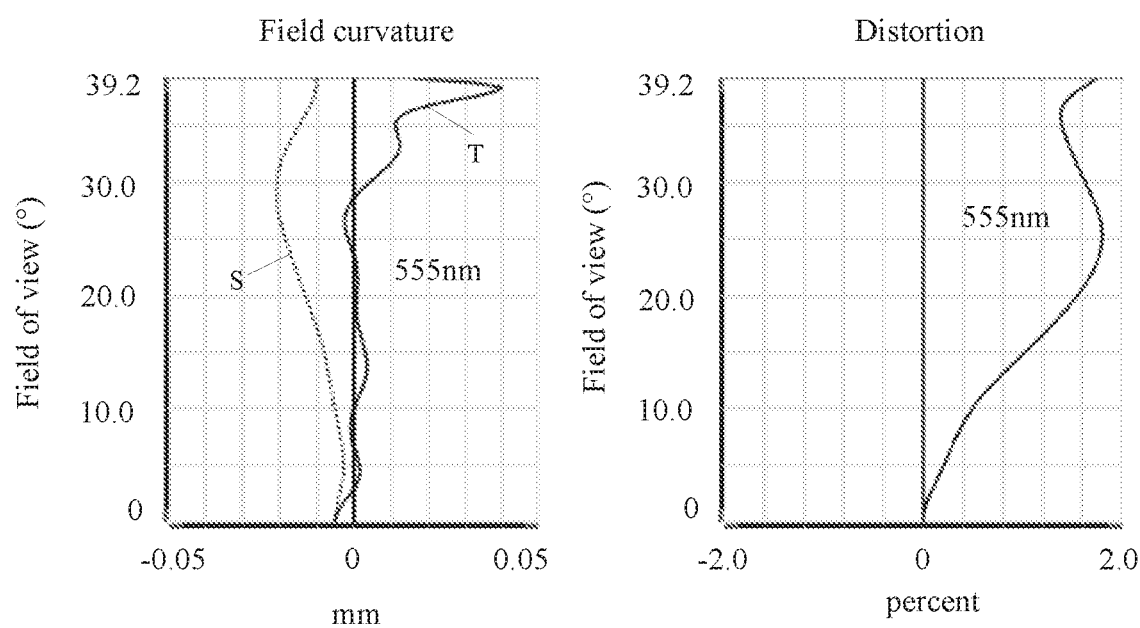
FIG. 8 is a schematic diagram of a field curvature and a distortion of the camera optical lens shown in FIG. 5.

FIG. 6 shows a longitudinal aberration of light with wavelengths of 435 nm, 470 nm, 510 nm, 555 nm, 610 nm and 650 nm passes the camera optical lens 20 in Embodiment 2, and FIG. 7 shows a lateral color of light with wavelengths of 435 nm, 470 nm, 510 nm, 555 nm, 610 nm and 650 nm passes the camera optical lens 20 in Embodiment 2. FIG. 8 shows a field curvature and a distortion schematic diagram after light with a wavelength of 555 nm passes the camera optical lens 20 in Embodiment 2.

As shown in Table 13, Embodiment 2 satisfies the various conditions.

In this embodiment, the entrance pupil diameter of the camera optical lens is 1.355 mm, an image height of 1.0H is 2.300 mm, and an Fov (field of view) in a diagonal direction is 78.40°. Thus, the camera optical lens 20 has a large aperture, wide-angle and ultra-thinness. Its on-axis and off-axis aberrations are fully corrected, thereby achieving excellent optical characteristics.

Embodiment 3

Figure 9:
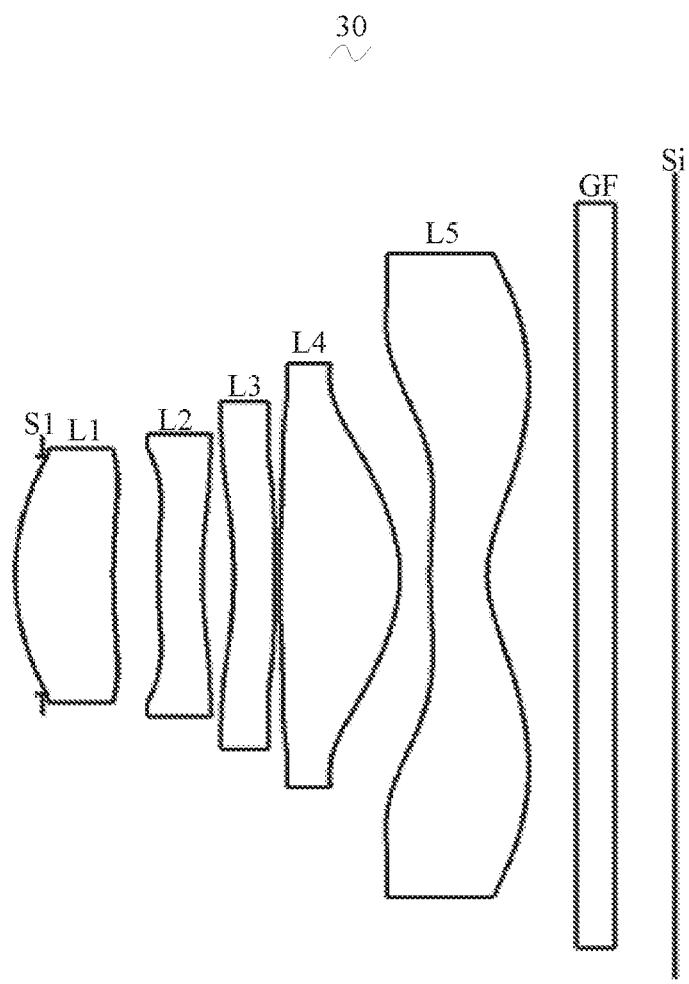
FIG. 9 is a schematic diagram of a structure of a camera optical lens in accordance with Embodiment 3 of the present disclosure.

Embodiment 3 is basically the same as Embodiment 1, and the meaning of symbols in this embodiment is the same as that of Embodiment 1. A structure of the camera optical lens 30 in Embodiment 3 is shown in FIG. 9. In the following, only differences are described.

Table 9 and table 10 show design data of a camera optical lens 30 in Embodiment 3 of the present disclosure.

TABLE 9

|  | R | d |  | nd |  | vd |
|---|---|---|---|---|---|---|
| S1 | ∞ | d0= | −0.149 |  |  |  |
| R1 | 1.342 | d1= | 0.549 | nd1 | 1.5450 v1 | 55.81 |
| R2 | 4.106 | d2= | 0.250 |  |  |  |
| R3 | 3.330 | d3= | 0.245 | nd2 | 1.6610 v2 | 20.53 |
| R4 | 2.593 | d4= | 0.175 |  |  |  |
| R5 | −2.961 | d5= | 0.230 | nd3 | 1.6610 v3 | 20.53 |
| R6 | −8.747 | d6= | 0.026 |  |  |  |
| R7 | 30.241 | d7= | 0.672 | nd4 | 1.5450 v4 | 55.81 |
| R8 | −0.843 | d8= | 0.169 |  |  |  |
| R9 | 2.659 | d9= | 0.320 | nd5 | 1.5450 v5 | 55.81 |
| R10 | 0.668 | d10= | 0.500 |  |  |  |
| R11 | ∞ | d11= | 0.210 | ndg | 1.5168 vg | 64.17 |
| R12 | ∞ | d12= | 0.339 |  |  |  |

Table 10 shows aspherical surface data of each lens of the camera optical lens 30 in Embodiment 3 of the present disclosure.

TABLE 10

|  | Conic coefficient | Aspheric surface coefficients | | | |
|---|---|---|---|---|---|
|  | k | A4 | A6 | A8 | A10 |
| R1 | 1.1824E+00 | −1.1048E−01 | 5.4683E−01 | −5.4765E+00 | 2.5693E+01 |
| R2 | −1.2799E+01 | −9.6949E−02 | −3.4180E−01 | 1.3419E+00 | −6.8765E+00 |
| R3 | −3.4445E+01 | −1.7575E−01 | −1.2568E+00 | 7.3851E+00 | −5.1080E+01 |
| R4 | −5.7210E+01 | 3.0762E−01 | −2.3927E+00 | 9.4154E+00 | −2.9465E+01 |
| R5 | 4.8892E+00 | 1.1606E−02 | −3.5699E−01 | 6.8355E−01 | 1.0205E+00 |
| R6 | 9.9994E+00 | 5.2827E−01 | −4.4206E+00 | 1.1288E+01 | −7.9301E+00 |
| R7 | 3.8822E+01 | 8.6993E−01 | −5.3005E+00 | 1.4338E+01 | −2.1481E+01 |
| R8 | −1.0168E+00 | 5.3438E−01 | −8.2335E−01 | 1.0751E+00 | −1.6606E+00 |
| R9 | −8.6999E+01 | −2.5383E−01 | −1.5369E−01 | 4.0933E−01 | −3.0508E−01 |
| R10 | −4.8981E+00 | −2.6018E−01 | 2.0254E−01 | −1.0994E−01 | 3.4163E−02 |

|  | Aspheric surface coefficients | | | | |
|---|---|---|---|---|---|
|  | A12 | A14 | A16 | A18 | A20 |
| R1 | −6.8886E+01 | 9.5836E+01 | −5.4612E+01 | 0.0000E+00 | 0.0000E+00 |
| R2 | 1.8249E+01 | −2.5855E+01 | 1.5319E+01 | 0.0000E+00 | 0.0000E+00 |
| R3 | 2.2360E+02 | −6.2594E+02 | 1.0963E+03 | −1.0698E+03 | 4.4117E+02 |
| R4 | 6.7325E+01 | −1.0596E+02 | 1.1493E+02 | −8.2027E+01 | 2.9956E+01 |
| R5 | −3.3247E+01 | 2.3202E+01 | 4.2634E+01 | −8.0045E+01 | 3.8078E+01 |
| R6 | −1.3484E+01 | 3.3009E+01 | −2.9346E+01 | 1.2467E+01 | −2.0913E+00 |
| R7 | 1.8347E+01 | −7.4060E+00 | −6.0409E−01 | 1.7368E+00 | −4.7846E−01 |
| R8 | 2.3684E+00 | −1.9983E+00 | 9.2907E−01 | −2.2959E−01 | 2.4607E−02 |
| R9 | 1.3525E−01 | −4.0859E−02 | 8.2501E−03 | −9.8110E−04 | 5.0524E−05 |
| R10 | −2.3137E−03 | −2.4346E−03 | 9.2918E−04 | −1.3570E−04 | 7.1554E−06 |

Table 11 and table 12 show inflexion points and arrest point design data of the camera optical lens 30 lens in Embodiment 3 of the present disclosure.

TABLE 11

|  | Number(s) of inflexion points | Inflexion point position 1 | Inflexion point position 2 | Inflexion point position 3 |
|---|---|---|---|---|
| P1R1 | 1 | 0.685 | 0 | 0 |
| P1R2 | 1 | 0.345 | 0 | 0 |
| P2R1 | 2 | 0.255 | 0.705 | 0 |
| P2R2 | 2 | 0.385 | 0.695 | 0 |
| P3R1 | 3 | 0.475 | 0.745 | 0.825 |
| P3R2 | 2 | 0.565 | 0.865 | 0 |
| P4R1 | 3 | 0.365 | 0.635 | 0.985 |

TABLE 11-continued

|  | Number(s) of inflexion points | Inflexion point position 1 | Inflexion point position 2 | Inflexion point position 3 |
|---|---|---|---|---|
| P4R2 | 2 | 0.795 | 1.205 | 0 |
| P5R1 | 3 | 0.235 | 1.015 | 1.745 |
| P5R2 | 3 | 0.415 | 1.795 | 1.875 |

TABLE 12

|  | Number(s) of arrest points | Arrest point position 1 | Arrest point position 2 |
|---|---|---|---|
| P1R1 | 0 | 0 | 0 |
| P1R2 | 1 | 0.535 | 0 |
| P2R1 | 1 | 0.415 | 0 |
| P2R2 | 0 | 0 | 0 |
| P3R1 | 0 | 0 | 0 |
| P3R2 | 2 | 0.765 | 0.925 |
| P4R1 | 1 | 1.075 | 0 |
| P4R2 | 1 | 1.135 | 0 |
| P5R1 | 2 | 0.435 | 1.455 |
| P5R2 | 1 | 1.105 | 0 |

Figure 10:
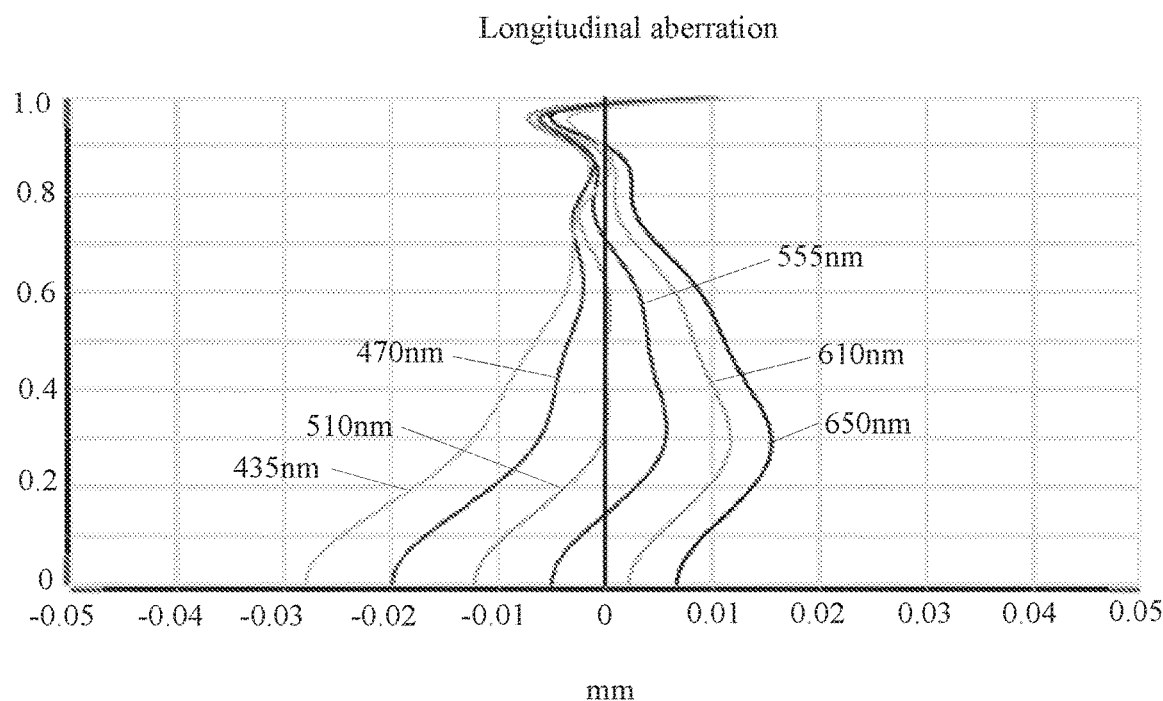
FIG. 10 is a schematic diagram of a longitudinal aberration of the camera optical lens shown in FIG. 9.
Figure 11:
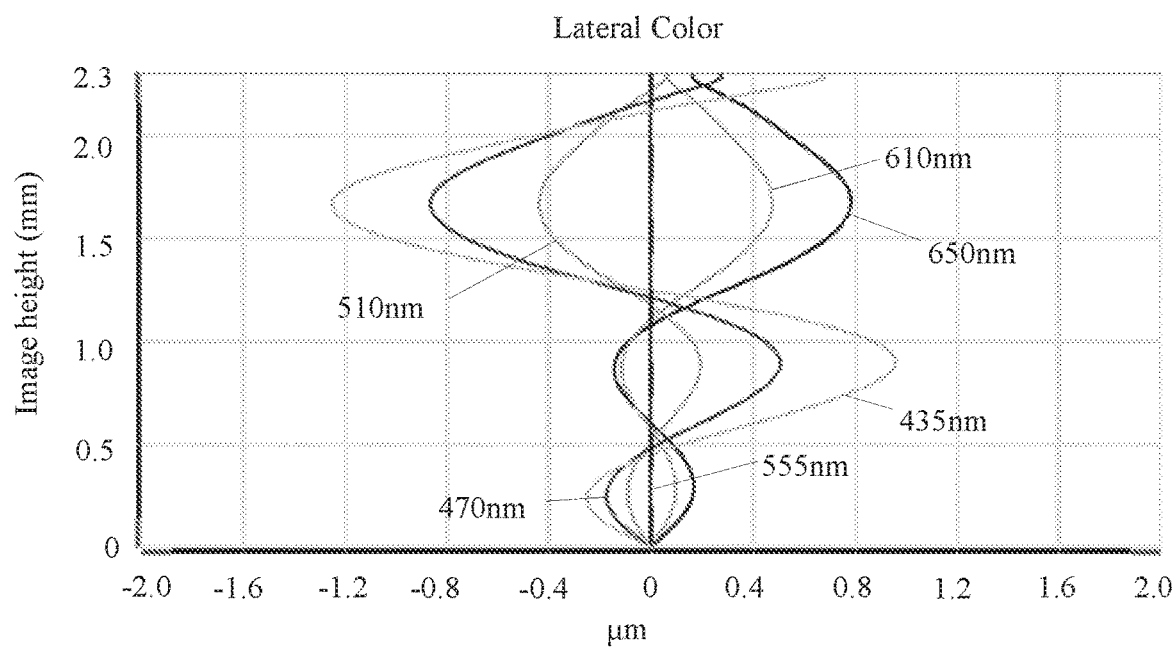
FIG. 11 is a schematic diagram of a lateral color of the camera optical lens shown in FIG. 9.
Figure 12:
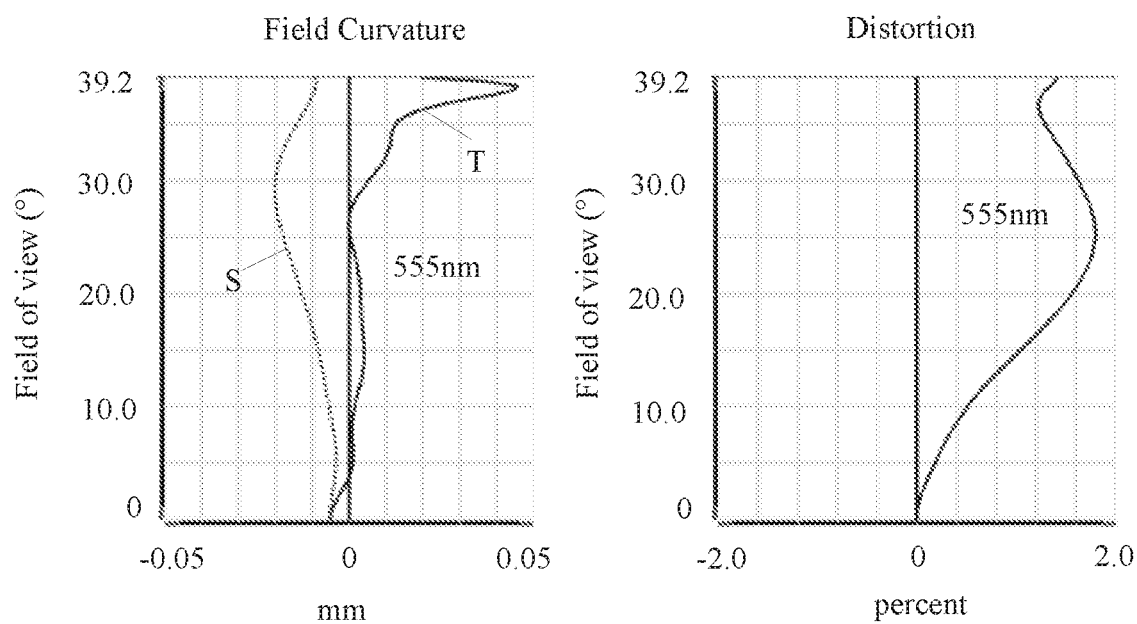
FIG. 12 is a schematic diagram of a field curvature and a distortion of the camera optical lens shown in FIG. 9.

FIG. 10 shows a longitudinal aberration of light with wavelengths of 435 nm, 470 nm, 510 nm, 555 nm, 610 nm and 650 nm passes the camera optical lens 30 in Embodiment 3, and FIG. 11 shows a lateral color of light with wavelengths of 435 nm, 470 nm, 510 nm, 555 nm, 610 nm and 650 nm passes the camera optical lens 30 in Embodiment 3. FIG. 12 shows a field curvature and a distortion schematic diagram after light with a wavelength of 555 nm passes the camera optical lens 30 in Embodiment 3.

The following Table 13 shows the values corresponding with the conditions in this embodiment according to the above conditions. Obviously, this embodiment satisfies the various conditions.

In this embodiment, the entrance pupil diameter of the camera optical lens is 1.359 mm, an image height of 1.0H is 2.300 mm, and an Fov (field of view) in the diagonal direction is 78.40°. Thus, the camera optical lens 30 has a large aperture, wide-angle and ultra-thinness. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f | 2.750 | 2.740 | 2.749 |
| f1 | 3.346 | 3.376 | 3.407 |
| f2 | −21.951 | −27.129 | −20.279 |
| f3 | −7.721 | −6.730 | −6.821 |
| f4 | 1.583 | 1.491 | 1.511 |
| f5 | −1.756 | −1.665 | −1.731 |
| f12 | 3.645 | 3.596 | 3.759 |
| f1/f2 | −0.15 | −0.12 | −0.17 |
| d1/d2 | 2.05 | 1.81 | 2.20 |
| d6/d8 | 0.18 | 0.19 | 0.15 |
| (R3 + R4)/(R3 − R4) | 9.13 | 9.98 | 8.04 |
| Fno | 2.02 | 2.02 | 2.02 |

It can be appreciated by one having ordinary skill in the art that the description above is only embodiments of the present disclosure. In practice, the one having ordinary skill in the art can make various modifications to these embodiments in forms and details without departing from the scope of the present disclosure.

What is claimed is:

1. A camera optical lens comprising, from an object-side to an image-side in sequence: a first lens having a positive refractive power, a second lens having a negative refractive power, a third lens having a negative refractive power, a fourth lens having a positive refractive power, and a fifth lens having a negative refractive power;

wherein the camera optical lens satisfies the following conditions:

$-0.17 \leq f1/f2 \leq -0.12$;

$1.80 \leq d1/d2 \leq 2.20$;

$0.15 \leq d6/d8 \leq 0.20$;

$8.00 \leq (R3+R4)/(R3-R4) \leq 10.00$;

$11.00 \leq R7/f \leq 12.00$;

where
f denotes a focal length of the camera optical lens;
f1 denotes a focal length of the first lens;
f2 denotes a focal length of the second lens;
d1 denotes an on-axis thickness of the first lens;
d2 denotes an on-axis distance from an image-side surface of the first lens to an object-side surface of the second lens;
d6 denotes an on-axis distance from an image-side surface of the third lens to an object-side surface of the fourth lens;
d8 denotes an on-axis distance from an image-side surface of the fourth lens to an object-side surface of the fifth lens;
R3 denotes a central curvature radius of the object-side surface of the second lens;
R4 denotes a central curvature radius of an image-side surface of the second lens;
R7 denotes a central curvature radius of the object-side surface of the fourth lens.

2. The camera optical lens according to claim 1, wherein the camera optical lens further satisfies the following conditions:

$0.61 \leq f1/f \leq 1.86$;

$-3.94 \leq (R1+R2)/(R1-R2) \leq -1.17$;

$0.07 \leq d1/TTL \leq 0.22$;

where
R1 denotes a central curvature radius of an object-side surface of the first lens;
R2 denotes a central curvature radius of the image-side surface of the first lens;
TTL denotes a total optical length from the object-side surface of the first lens to an image surface of the camera optical lens along an optic axis.

3. The camera optical lens according to claim 1, wherein the camera optical lens further satisfies the following conditions:

$-19.80 \leq f2/f \leq -4.92$;

$0.03 \leq d3/TTL \leq 0.10$;

where
d3 denotes an on-axis thickness of the second lens;
TTL denotes a total optical length from an object-side surface of the first lens to an image surface of the camera optical lens along an optical axis.

4. The camera optical lens according to claim 1, wherein the camera optical lens further satisfies the following conditions:

$-5.62 \leq f3/f \leq -1.64$;

$-5.34 \leq (R5+R6)/(R5-R6) \leq -1.35$;

$0.03 \leq d5/TTL \leq 0.09$;

where
f3 denotes a focal length of the third lens;
R5 denotes a central curvature radius of an object-side surface of the third lens;
R6 denotes a central curvature radius of the image-side surface of the third lens;
d5 denotes an on-axis thickness of the third lens;
TTL denotes a total optical length from an object-side surface of the first lens to an image surface of the camera optical lens along an optic axis.

5. The camera optical lens according to claim 1, wherein the camera optical lens further satisfies the following conditions:

$0.27 \leq f4/f \leq 0.86$;

$0.47 \leq (R7+R8)/(R7-R8) \leq 1.43$;

$0.09 \leq d7/TTL \leq 0.29$;

where
f4 denotes a focal length of the fourth lens;
R8 denotes a central curvature radius of the image-side surface of the fourth lens;
d7 denotes an on-axis thickness of the fourth lens;
TTL denotes a total optical length from an object-side surface of the first lens to an image surface of the camera optical lens along an optical axis.

6. The camera optical lens according to claim 1, wherein the camera optical lens further satisfies the following conditions:

$-1.28 \leq f5/f \leq -0.41;$ $0.84 \leq (R9+R10)/(R9-R10) \leq 2.61;$ $0.04 \leq d9/TTL \leq 0.14;$ where f5 denotes a focal length of the fifth lens;

R9 denotes a central curvature radius of the object-side surface of the fifth lens;

R10 denotes a central curvature radius of an image-side surface of the fifth lens;

d9 denotes an on-axis thickness of the fifth lens;

TTL denotes a total optical length from an object-side surface of the first lens to an image surface of the camera optical lens along an optic axis.

7. The camera optical lens according to claim 1, wherein the camera optical lens further satisfies the following conditions:

$TTL/IH \leq 1.61;$ where

TTL denotes a total optical length from an object-side surface of the first lens to an image surface of the camera optical lens along an optical axis;

IH denotes an image height of the camera optical lens.

8. The camera optical lens according to claim 1, wherein the camera optical lens satisfies the following conditions:

$Fov > 78.00°;$ where

Fov denotes a field of view of the camera optical lens.

9. The camera optical lens according to claim 1, wherein the camera optical lens satisfies the following conditions:

$Fno \leq 2.05;$ where

Fno denotes an F number of the camera optical lens.

* * * * *